United States Patent [19]

Simone

[11] 4,126,949
[45] Nov. 28, 1978

[54] EDUCATIONAL CALCULATOR
[75] Inventor: Richard B. Simone, Sunnyvale, Calif.
[73] Assignee: National Semiconductor Corporation, Santa Clara, Calif.
[21] Appl. No.: 834,784
[22] Filed: Sep. 19, 1977

Related U.S. Application Data

[63] Continuation of Ser. No. 650,536, Jan. 19, 1976, abandoned.
[51] Int. Cl.² .................................................. G09B 19/02
[52] U.S. Cl. ..................................... 35/31 C; 35/9 B
[58] Field of Search ................. 35/9 R, 9 A, 8 R, 6, 35/30, 31 R, 31 C, 48 R, 9, 8, 31, 48; 364/709

[56] References Cited
U.S. PATENT DOCUMENTS

| | | | |
|---|---|---|---|
| 3,371,321 | 2/1968 | Adams | 35/8 R |
| 3,584,398 | 6/1971 | Meyer et al. | 35/9 A X |
| 3,787,988 | 1/1974 | Nakajima et al. | 35/31 R |
| 3,854,226 | 12/1974 | Divine et al. | 35/9 B X |
| 3,925,909 | 12/1975 | Duncan | 35/31 R |
| 3,974,575 | 8/1976 | Duncan | 35/31 R |

Primary Examiner—Vance Y. Hum
Attorney, Agent, or Firm—Brown & Martin

[57] ABSTRACT

An educational calculator including a keyboard, a programmable logic array calculator circuit, an accumulator, a comparator, and two LED's for indicating whether the supposed answer is correct is disclosed. The keyboard includes a plurality of numerical input keys for entering operands and a supposed answer, a plurality of mathematical function keys for selecting mathematical functions, an "=" key, and test key. The programmable logic array is programmed for performing mathematical calculations selected by manipulation of the mathematical function keys upon operands entered by manipulation of the numerical input keys to produce a calculated answer. The answer is calculated upon subsequent manipulation of any mathematical function key or the "=" key. The accumulator stores the calculated answer. The programmable logic array is connected to the "=" key for being conditioned by manipulation of the "=" for subtracting from the calculated answer stored in the accumulator, a supposed answer entered upon subsequent manipulation of the numerical input keys. The comparator responds to manipulation of the test key by comparing the contents of the accumulator with zero. The LED's are of contrasting colors. They are connected to the comparator for indicating the results of the comparison. The green LED lights up in response to the comparison being made when the contents of the accumulator are zero, thereby indicating that the supposed answer entered subsequent to manipulation of the "=" key is correct. The red LED lights up in response to the comparison being made when the contents of the accumulator are not zero, thereby indicating that the entered supposed answer is incorrect.

3 Claims, 4 Drawing Figures

EDUCATIONAL CALCULATOR

This is a continuation of application, Ser. No. 650,536, filed Jan. 19, 1976, now abandoned.

BACKGROUND OF THE INVENTION

1. Field of the Invention

This invention relates to a calculator and more particularly to an educational calculator and method that solves a mathematical problem without displaying the answer, subtracts from the calculated answer a supposed correct answer introduced by the user, and indicates whether the resultant of the subtraction is equal to zero (a correct answer) or is unequal to zero (an incorrect answer).

2. Description of the Prior Art

Hand held calculators as exemplified by those employing an integrated circuit designated MM5737 and marketed by National Semiconductor Corporation of Santa Clara, Calif. are and have been available for some time. Such calculators have a keyboard including keys for affording input of decimal numbers and mathematical functions; the calculators also have numeric LED displays for displaying to the user the correct answer. These prior art calculators can be extremely simple and perform only arithmetic calculations or can be implemented to calculate and display logarithms, trigonometric functions, square roots, and virtually any mathematical relationship desired. Such calculators, moreover, can employ standard algebraic notation or reverse Polish notation.

SUMMARY OF THE INVENTION

The present invention provides an educational calculator which in addition to solving a given problem, requires the user independently to solve the same problem and introduce the supposed answer into the calculator. The calculator compares the calculated answer with the supposed answer in response to activation of a test key and indicates either correspondence between the two answers or non-correspondence so as to afford the student an immediate indication of the correctness of his independent solution to the problem.

An object of the present invention is to provide a calculator that tests mathematical skills in a rapid, convenient and entertaining manner. This object is achieved by providing a calculator which calculates an answer to a problem but does not display the answer as in prior art calculators. Rather it compares the correct answer with a supposed answer introduced by the user and indicates whether the user's answer is correct or incorrect.

Another object of the invention is to program a more or less conventional integrated calculator chip to achieve the functions discussed above. This object is achieved by providing a keyboard key that activates the subtraction function within the calculator and by providing a visual indicia associated with the key in the form of an "=" sign. Accordingly, the user is guided through manipulation of the calculator and solution of a problem in a logical and straightforward manner.

The educational calculator of the present invention includes a keyboard, including a plurality of numerical input keys for entering operands and a supposed answer, a plurality of mathematical function keys for selecting mathematical functions, an "=" key, and a test key; a calculator circuit for performing mathematical calculations selected by manipulation of the methematical function keys to produce a calculated answer, wherein said answer is calculated upon subsequent manipulation of any methematical function key or the "=" key; and an accumulator for storing the calculated answer.

The educational calculator of the present invention is characterized by the calculator circuit being connected to the "=" key for being conditioned by manipulation of the "=" key for subtracting from the calculated answer stored in the accumulator a supposed answer entered upon subsequent manipulation of the numerical input keys; a comparator that is responsive to manipulation of the test key for comparing the contents of the accumulator with zero; and an indicator that is coupled to the comparator for indicating the results of the comparison, wherein an indication that the supposed answer is correct is provided upon the comparison being made when the contents of the accumulator are zero.

Preferably the indicators are adapted for providing an indication that the supposed answer is incorrect upon the comparison being made when the contents of the accumulator are not zero.

In the preferred embodiment, the calculator circuit consists of a programmable logic array integrated circuit.

The foregoing together with other objects features and advantages will be more apparent after referring to the following specification and the accompanying drawings.

DESCRIPTION OF THE PREFERRED EMBODIMENT

Figure 3:
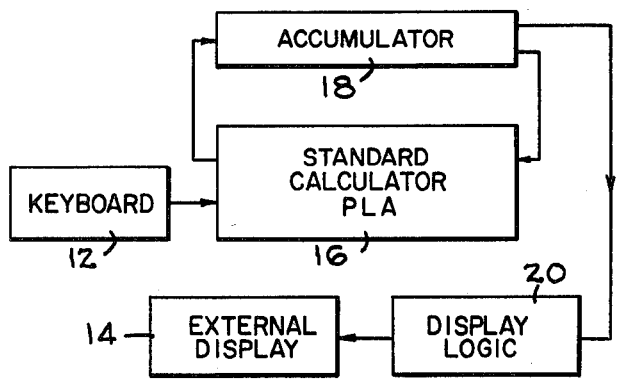
FIG. 3 is a block diagram and flow chart showing data flow and operation of a prior art hand held calculator.

Referring more particularly to the drawing and specifically to FIG. 3, a standard existing four function pocket calculator includes a keyboard 12 which has keys for decimal numerals from zero to nine together with mathematical function keys for +, −, ×, ÷ and =. Visually accessible and typically immediately adjacent the keyboard is an external display 14 which is composed of a plurality of numeric LED displays, there typically being six or eight such displays to afford display of an answer having a corresponding number of digits. Interior of the calculator and typically on a single integrated circuit chip is a standard calculator programmable logic array 16, an accumulator 18 and display logic 20. Programmable logic array 16 receives signals from keyboard 12 and performs the appropriate mathematical operation and stores the results in accumulator 18. Accumulator 18 activates display logic 20 which in turn appropriately excites the numeric LED's in external display 14 to display an answer to the problem introduced into the calculator by manipulation of the keys on keyboard 12. The calculator described next above is conventional and is not part of the invention; the above description facilitates understanding of the invention.

Figure 4:
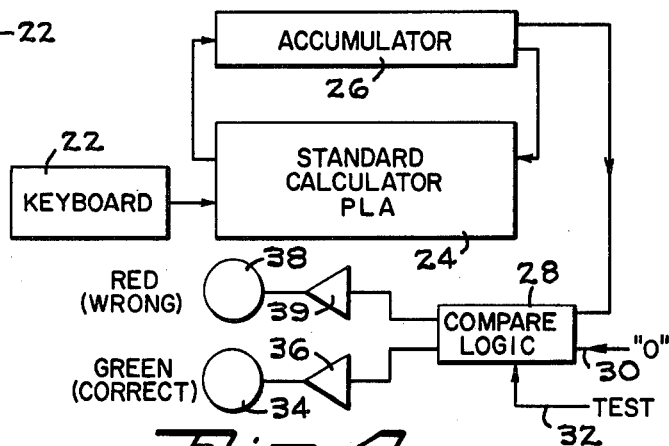
FIG. 4 is a view similar to FIG. 3 showing in block diagram form the data flow in a calculator embodying the invention.

With reference to FIG. 4, there is a keyboard 22 for effecting introduction of the decimal numbers and the mathematical functions into a standard calculator programmable logic array 24 employed in the invention. The programmable logic array receives the inputs from the keyboard, performs the indicated methematical calculations and stores the calculated answer in an accumulator 26. The calculated answer is retained in accumulator 26 until the supposed answer is introduced by the user into the programmable logic array 24 by appropriate manipulation of the keys on keyboard 22. Thereafter, the calculator subtracts the supposed answer from the correct answer stored in accumulator 26 and the resultant is supplied to one input of a comparator 28, the other input of which is a zero connected at 30. A resultant of zero denotes correctness of the supposed answer introduced by the user; a resultant other than zero denotes incorrectness of such supposed answer. Comparator 28 is then activated by depression of a test key 32; if the resultant from accumulator 26 is zero, an LED 34 is excited through an amplifier 36, the LED 34 typically displaying a green color. If on the other hand the comparator detects a noncoincidence between zero and the resultant in accumulator 26, an LED 38 is excited through an amplifier 39. LED 38 is preferably of contrasting color, e.g. red, to the color produced by LED 34. Consequently, the user of the educational calculator is informed whether his supposed answer is the correct answer, the calculator circuitry subtracting his supposed answer from the correct answer stored in accumulator 26 and indicating either a coincidence with zero or noncoincidence with zero.

Figure 1:
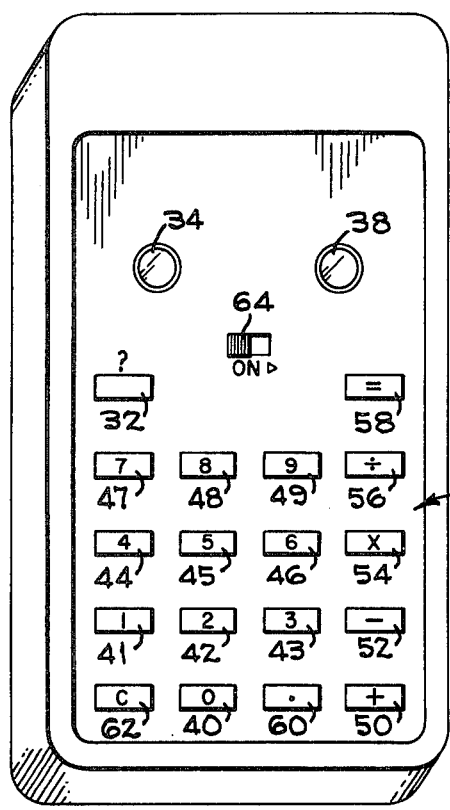
FIG. 1 is a view of a case and keyboard for a calculator embodying the present invention.

Referring to FIG. 1 keyboard 22 has 10 keys, 40–49, inclusive, for affording input of corresponding decimal numbers. The specific structure of the keys and the electrical contacts actuated thereby forms no part of the invention and will not be further described. Keyboard 22 also includes a plurality of mathematical function keys such as an Addition key 50, a Subtraction key 52, a Multiplication key 54, a Division key 56 and an Equal key 58. As will appear hereinafter, the Equal key 58 is electrically connected in parallel to the Subtraction key 52, because the invention operates by subtracting a supposed answer introduced by the user from the correct answer calculated by the calculator and stored in accumulator 26. There is also a Decimal Point key 60 and a Clear key 62, together with power switch 64 for controlling the supply of power from a batter 66 to the calculator circuitry.

Interior of the case of which keyboard 22 is a part is an integrated circuit 68, the integrated circuit containing programable logic array 24, accumulator 26, compare logic 28, and amplifiers 36 and 39 therein.

Figure 2:
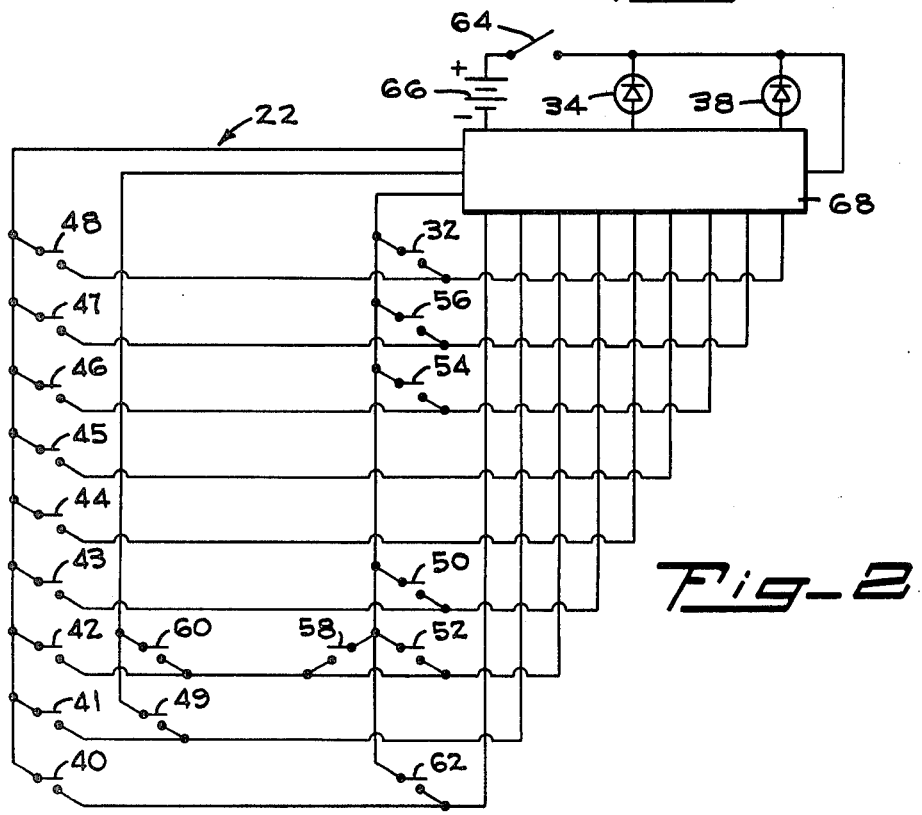
FIG. 2 is a schematic block diagram of a calculator embodying the present invention.

From the schematic diagram of FIG. 2 several important considerations can be noted. The Subtraction key 52 and the Equal key 54 are connected in parallel so that actuation of the Equal key 58 causes the elements in integrated circuit 68 to perform subtraction. Moreover, test key 32 functions as an "=" key in that it causes comparator 28 to be read and to activate one or the other of LEDs 34 and 38.

A more detailed understanding of the invention can be had from the following example which is contrasted in tabular form with the similar manipulations in a standard calculator of the type shown in FIG. 3. The table compares the methematical operation 2 × 3 = 6 as performed on a standard calculator and as performed on the educational calculator of this invention.

| Standard Calculator | | Educational Calculator | |
|---|---|---|---|
| Key Input | Internal Function | Key Input | Internal Function |
| 2 | Enter | 2 | Enter |
| × | Store Function | × | Store Function |
| 3 | Enter | 3 | Enter |
| = | Perform Function and Accumulate and Display 6 | = | Perform Previous Function, Accumulate Answer and Store Subtract Function |
| | | 6 (Supposed answer) | Enter |
| | | ? (Test) | Perform Subtract Function to Derive Resultant and Excite LED 34 to Indicate Zero Resultant |

In the tabulated example, the supposed answer introduced by the user is correct, in consequence of which a zero resultant effects activation of LED 34. If a different or incorrect supposed answer is introduced by the user, the resultant in accumulator 26 will be different from zero, in consequence of which LED 38 will be activated upon depression of test key 32.

From the foregoing it will be noted that the first three steps are identical and that, after completion of those steps, each of the calculators is prepared to calculate the correct answer. When the "=" key of the standard calculator is depressed the correct answer, 6, is calculated and displayed. In contrast, when the "=" key of the educational calculator of the invention is depressed the correct answer is calculated and accumulated but not displayed; additionally, a subtract function is stored in logic array 24 pending input of a decimal number representing the supposed answer. On entry of such supposed answer, and actuation of the test ("?") key, the supposed answer is subtracted from the calculated answer stored in accumulator 26 to produce and accumulate a resultant, and LED 34 is excited if a zero resultant or coincidence exists, and LED 38 is excited if a non zero resultant or noncoincidence exists.

The above example employs algebraic notation which is typical of many calculators. It should be clear that the invention can be embodied with equal facility in calculators employing reverse Polish notation, and it can be incorporated into calculators performing other than simple arithmetic functions. For example, if a student wishes to master the use of tables of logarithms or trigonometric functions, an educational calculator according to the invention and employing an appropriate fabricated programmable logic array 22 operates to calculate and store the correct answer, to receive introduction of the student's supposed answer, to subtract the supposed answer from the calculated answer to produce a resultant, and to compare the result with zero, after which the correctness or wrongness of the answer is displayed. In practicing the invention in such circumstances only one operand, e.g. 45°, and one function, e.g., cosine, are introduced before actuation of the "=" key.

To recapitulate the invention in terms of method, it can be seen that it is first necessary to provide a calculator capable of performing mathematical functions and specifically capable of performing subtraction. There is also provided in accordance with the method of the invention, a keyboard having decimal keys, mathematical function keys and an "=" key connected to activate the subtraction system in the calculator. Then the method is performed by following the steps of entering at least one operand, entering a mathematical function symbol, and actuating the "=" (i.e. subtract) key to calculate and accumulate a correct answer. Thereafter, the user derives a supposed correct answer and enters that supposed answer by appropriate manipulation of the keys on the keyboard. Entry of the supposed correct answer after actuation of the "=" key and before actuation of the test ("?") key causes the calculator to subtract the supposed answer from the stored correct answer to produce a resultant, compare the resultant with zero and excite one of two visual indicators, depending on whether the resultant is equal to zero or unequal to zero. Because a standard programmable logic array is employed, the invention can also accommodate problems with negative answers.

Thus it will be seen that the invention provides an extremely useful learning tool for arithmetic or other mathematical procedures. The invention is implemented in a more or less standard calculator by minor modifications thereto which reduce the cost and complexity of the calculator while at the same time providing an improved educational function not conveniently achievable with known prior art calculators. Finally, the invention provides a method or a program for achieving the salutary functions referred to above by subtracting from a calculated answer a supposed correct answer and testing whether such subtraction produces a resultant equal to zero or inequal to zero. Although one embodiment has been shown and described, it will be obvious that other adaptations and modifications can be made without departing from the true spirit and scope of this invention.

What is claimed is:

1. An educational calculator, comprising:
a keyboard, including
    a plurality of numerical input keys for entering operands and a supposed answer,
    a plurality of mathematical function keys for selecting mathematical functions,
    an "=" key, and
    a test key;
calculating means for performing mathematical calculations selected by manipulation of the mathematical function keys upon operands entered by manipulation of the numerical input keys to produce a calculated answer, wherein said answer is calculated upon subsequent manipulation of any mathematical function key or the "=" key;
accumulator means for storing said calculated answer;
wherein the calculating means are connected to the "=" key for being conditioned by manipulation of the "=" key for subtracting from said calculated answer stored in the accumulator a supposed answer entered upon subsequent manipulation of the numerical input keys; means for providing zero; said test key being connected to comparator means wherein
said comparator means are responsive to manipulation of the test key for comparing the contents of the accumulator with zero; and
indication means coupled to the comparator means for indicating the results of said comparison, wherein an indication that the supposed answer is correct is provided upon said comparison being made when the contents of the accumulator are zero.

2. An educational calculator according to claim 1, wherein the indication means are adapted for providing an indication that the supposed answer is incorrect upon said comparison being made when the contents of the accumulator are not zero.

3. An educational calculator according to claim 1, wherein the calculating means consists of a programmable logic array integrated circuit.

* * * * *